United States Patent
Kazmierski et al.

(10) Patent No.: US 12,242,237 B2
(45) Date of Patent: Mar. 4, 2025

(54) METHODS AND MECHANISMS FOR GENERATING A DATA COLLECTION PLAN FOR A SEMICONDUCTOR MANUFACTURING SYSTEM

(71) Applicant: APPLIED MATERIALS, INC., Santa Clara, CA (US)

(72) Inventors: William Kazmierski, Round Rock, TX (US); Joseph Blanco, Georgetown, TX (US); Balaji Pasupathy, Chennai (IN)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/554,428

(22) Filed: Dec. 17, 2021

(65) Prior Publication Data
US 2023/0195071 A1 Jun. 22, 2023

(51) Int. Cl.
*G05B 19/18* (2006.01)
*G05B 19/406* (2006.01)

(52) U.S. Cl.
CPC ......... *G05B 19/188* (2013.01); *G05B 19/406* (2013.01); *G05B 2219/32128* (2013.01); *G05B 2219/45031* (2013.01)

(58) Field of Classification Search
CPC .............. G05B 19/188; G05B 19/406; G05B 2219/32128; G05B 2219/45031; G05B 19/4183; G05B 2219/31282; Y02P 90/02
See application file for complete search history.

(56) References Cited

U.S. PATENT DOCUMENTS

| | | | |
|---|---|---|---|
| 2006/0184264 A1* | 8/2006 | Willis | G05B 19/4184 700/110 |
| 2009/0150811 A1* | 6/2009 | Ouyang | G06Q 10/06 715/764 |
| 2009/0171606 A1* | 7/2009 | Murata | G01R 31/2894 702/81 |
| 2012/0242667 A1* | 9/2012 | Kaushal | G06F 3/04842 345/440 |
| 2014/0240484 A1* | 8/2014 | Kodama | G02B 27/017 348/86 |
| 2019/0072943 A1* | 3/2019 | Przybylski | G06Q 10/06 |
| 2021/0174200 A1* | 6/2021 | Huang | G06N 3/0454 |

\* cited by examiner

*Primary Examiner* — Kenneth M Lo
*Assistant Examiner* — Mohammed Shafayet
(74) *Attorney, Agent, or Firm* — Lowenstein Sandler LLP

(57) ABSTRACT

A method includes initiating a connection with a semiconductor manufacturing system. The method further includes generating a set of tool data items associated with the semiconductor manufacturing system. The method further includes providing a graphical user interface (GUI) presenting the set of tool data items associated with the semiconductor manufacturing system and receiving and via the GUI, user input selecting one or more of the tool data items. The method further includes adding configuration data associated with one or more of the tool data items to a data collection plan. The method further includes validating the configuration data by locating, in the manufacturing system, a configuration data file associated with the configuration data. The method further includes executing one or more data collection operations based on the data collection plan.

22 Claims, 12 Drawing Sheets

| Field | Value | Ref |
|---|---|---|
| Tool Name : | Tool1-123456 | 410 |
| Vender Serial No : | 123456 | 412 |
| Bay Location : | 555123 | 414 |
| Tool IP/Hostname : | 127.0.0.1 | 416 |
| Tool Port : | 5003 | 418 |
| Tool Type : | ENDURA CGA MDP SECS | 420 |
| AIM File Location: | ● From Tool    ○ Local File | |
| Local File Loc.: | | 422 |

Load Chambers...    0%    Back    Next    Cancel

FIG. 5A

| All | Position | Tool Instance △ | Variants | Descriptions | Process Type | Gaslines |
|---|---|---|---|---|---|---|
| [A] | [A] | [A] | [A] | [A] | [A] | [A] ▼ ☑ |
| ☐ | 1 | Not Configured | CVD | Default | Not Configured | Configure |
| ☐ | 2 | Not Configured | CVD | Default | Not Configured | Configure |
| ☐ | 3 | Not Configured | CVD | Default | Not Configured | Configure |
| ☐ | 4 | Not Configured | CVD | Default | Not Configured | Configure |
| ☐ | 5 | Not Configured | CVD | Default | Not Configured | Configure |
| ☐ | A | Not Configured | Cool down | Default | Not Configured | Configure |
| ☐ | B | Not Configured | Cool down | Default | Not Configured | Configure |
| ☐ | BUF-R | Not Configured | Robot | Default | Not Configured | Configure |
| ☐ | BUF-R | Not Configured | Robot | Default | Not Configured | Configure |
| ☐ | C | Not Configured | CVD | Default | Not Configured | Configure |
| ☐ | D | Not Configured | CVD | Default | Not Configured | Configure |
| ☐ | E | Not Configured | Degas | Default | Not Configured | Configure |
| ☐ | F | Not Configured | Degas | Default | Not Configured | Configure |
| ☐ | LLA1 | Not Configured | Loadlock | Default | Not Configured | Configure |

Tool Name : Tool1-123456

Drag a column header here to group by that column.

Configure Chambers...   10% Discover Gasline   Back   Next   Cancel

FIG. 5C

| All | Position | Tool Instance |
|---|---|---|
| [A] | [A] | [A] |
| ☑ | 1 | Tool1-123456_1 |
| ☑ | 2 | Tool1-123456_2 |
| ☐ | 3 | Tool1-123456_3 |
| ☐ | 4 | Tool1-123456_4 |
| ☑ | 5 | Tool1-123456_5 |
| ☑ | A | Tool1-123456_A |
| ☑ | B | Tool1-123456_B |
| ☐ | BUF-R | Not Configured |
| ☐ | BUF-R | Not Configured |
| ☑ | C | Tool1-123456_C |
| ☐ | D | Not Configured |
| ☐ | E | Not Configured |
| ☑ | F | Tool1-123456_F |
| ☐ | UA1 | Not Configured |

Drag a column header here to group by that

METHODS AND MECHANISMS FOR GENERATING A DATA COLLECTION PLAN FOR A SEMICONDUCTOR MANUFACTURING SYSTEM

TECHNICAL FIELD

The present disclosure relates to electrical components, and, more particularly, to methods and mechanisms for generating a data collection plan for a semiconductor manufacturing system.

BACKGROUND

Products can be produced by performing one or more manufacturing processes using manufacturing equipment. For example, semiconductor manufacturing equipment (e.g., a process tool) can be used to produce semiconductor devices (e.g., substrates, wafers, etc.) via semiconductor manufacturing processes. The process tool can deposit a film on the surface of the substrate and can perform an etch process to form the intricate pattern in the deposited film. For example, the process tool can perform a chemical vapor deposition (CVD) process to deposit a film on the substrate. Sensors can be used to determine manufacturing parameters of the process tool during the manufacturing processes and metrology equipment can be used to determine property data of the products that were produced by the process tool.

Tool sensor data can be collected through Data Collection Plans (DCPs). Separate DCPs are created for each process tool to match variation in the hardware. In some manufacturing systems, DCPs need to be matched to enable digital tools, analytics, and predictive technologies. Typically, a highly-skilled worker would setup a DCP (sensors, events, alarms, & system configurations) for each process tool over weeks or months. As such, it can be a difficult and time-consuming process to set up a DCP for process tools.

SUMMARY

The following is a simplified summary of the disclosure in order to provide a basic understanding of some aspects of the disclosure. This summary is not an extensive overview of the disclosure. It is intended to be neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes initiating, by a processing device or a server, a connection with a semiconductor manufacturing system. The method further includes generating a set of tool data items associated with the semiconductor manufacturing system. The method further includes providing, by the server, a graphical user interface (GUI) presenting the set of tool data items associated with the semiconductor manufacturing system and receiving, by the server and via the GUI, user input selecting one or more of the tool data items. The method further includes adding configuration data associated with one or more of the tool data items to a data collection plan. The method further includes validating the configuration data by locating, in the semiconductor manufacturing system, a configuration data file associated with the configuration data. The method further includes executing, by the server, one or more data collection operations at the semiconductor manufacturing system based on the data collection plan.

In another aspect of the disclosure, a system includes a memory and a processing device operatively coupled with the memory. The processing device can perform operations comprising initiating a connection with a semiconductor manufacturing system. The processing device can further perform operations comprising generating a set of tool data items associated with the semiconductor manufacturing system. The processing device can further perform operations comprising providing a graphical user interface (GUI) presenting the set of tool data items associated with the semiconductor manufacturing system and receiving, via the GUI, user input selecting one or more of the tool data items. The processing device can further perform operations comprising adding configuration data associated with one or more of the tool data items to a data collection plan. The processing device can further perform operations comprising validating the configuration data by locating, in the semiconductor manufacturing system, a configuration data file associated with the configuration data. The processing device can further perform operations comprising executing one or more data collection operations at the semiconductor manufacturing system based on the data collection plan.

In another aspect of the disclosure, a non-transitory computer-readable storage medium comprising instructions that, when executed by a processing device, cause the processing device to perform operations comprising initiating a connection with a semiconductor manufacturing system. The processing device can further perform operations comprising generating a set of tool data items associated with the semiconductor manufacturing system. The processing device can further perform operations comprising providing a graphical user interface (GUI) presenting the set of tool data items associated with the semiconductor manufacturing system and receiving, via the GUI, user input selecting one or more of the tool data items. The processing device can further perform operations comprising adding configuration data associated with one or more of the tool data items to a data collection plan. The processing device can further perform operations comprising validating the configuration data by locating, in the semiconductor manufacturing system, a configuration data file associated with the configuration data. The processing device can further perform operations comprising executing one or more data collection operations at the semiconductor manufacturing system based on the data collection plan.

BRIEF DESCRIPTION OF THE DRAWINGS

The present disclosure is illustrated by way of example, and not by way of limitation in the figures of the accompanying drawings.

FIGS. 5A-5F are illustrations of example GUI interfaces for generating the DCP, according to certain embodiments.

DETAILED DESCRIPTION

Figure 1:
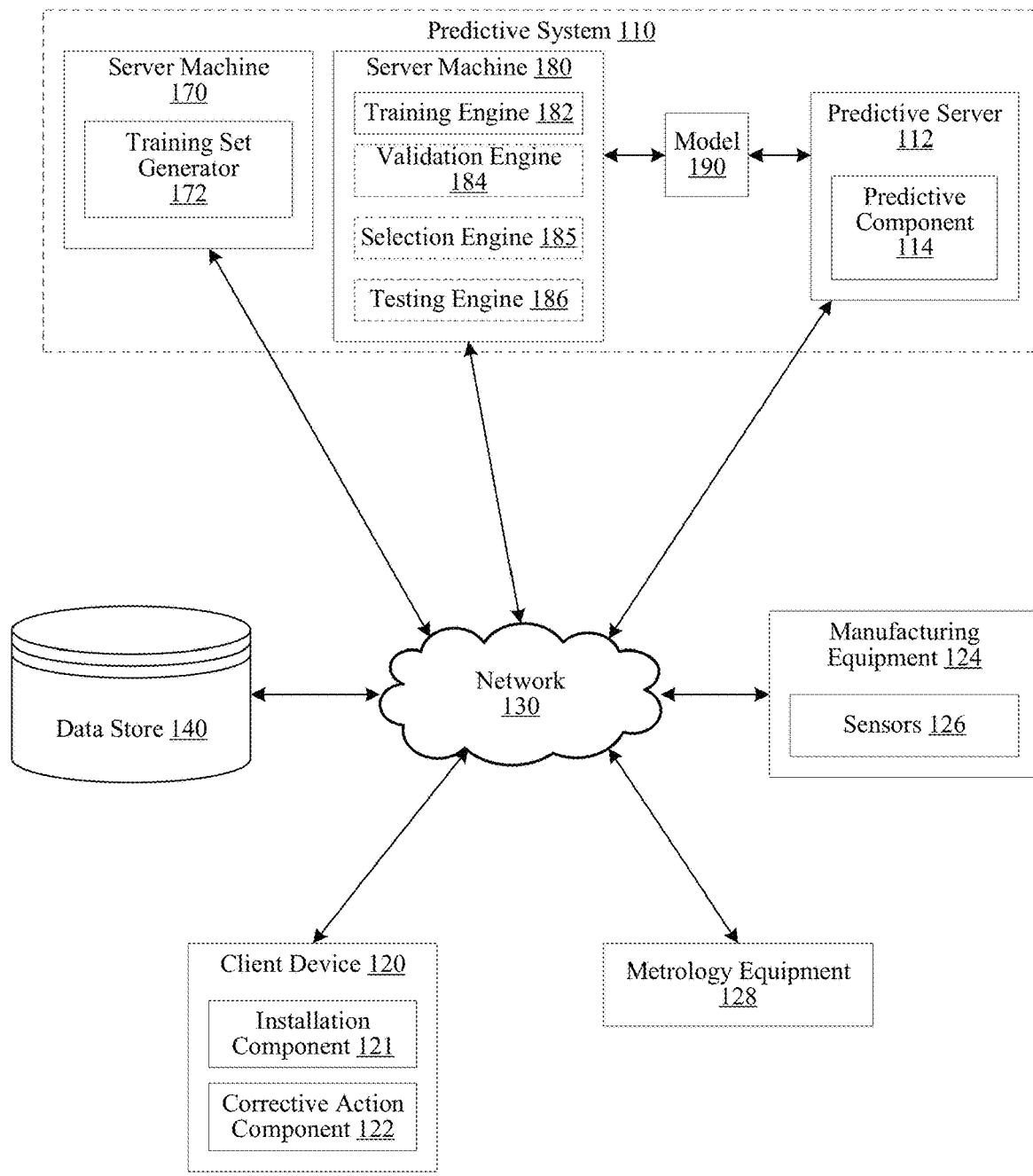
FIG. 1 is a block diagram illustrating an exemplary system architecture, according to certain embodiments.

Described herein are technologies directed to methods and mechanisms for generating a Data Collection Plan (DCP) for a semiconductor manufacturing system. A DCP is a procedure to collect sensor data, event data, alert data, and settings data from a manufacturing system using a combination of pre-configured settings, parsing tool-generated configuration files, and information collected through communication with the manufacturing system.

A manufacturing system can include multiple process chambers. A process chamber can have multiple sub-systems operating during each substrate manufacturing process (e.g., the deposition process, the etch process, the polishing process, etc.). A sub-system can be characterized as a set of sensors related with an operational parameter of the process chamber. An operational parameter can be a temperature, a flow rate, a pressure, and so forth. In an example, a pressure sub-system can be characterized by one or more sensors measuring the gas flow, the chamber pressure, the control valve angle, the foreline (vacuum line between pumps) pressure, the pump speed, and so forth. Accordingly, the process chamber can include a pressure sub-system, a flow sub-system, a temperature subsystem, and so forth.

The manufacturing system can collect sensor data for maintenance, analytics, and predictive technologies. For example, each sub-system can experience deterioration and deviate from optimal performance conditions, such as, the pressure sub-system can generate reduced pressure due to one or more of pump issues, control valve issues, etc. Failure to catch and repair these deteriorating conditions can cause defects in the substrates, leading to inferior products, reduced manufacturing yield, and significant downtime and repair time.

Existing systems can collect sensor data using DCPs that are typically setup, for each process tool, by manual entering each item (sensors, events, alarms, & system configurations) into the DCP, which can take weeks or months. This makes setting up a DCP a very difficult and time-consuming process.

Aspects and implementations of the present disclosure address the shortcomings of the existing technology by automatically generating a DCP for a manufacturing system. In some embodiments, client device can initiate a connection with a manufacturing system. For example, the client device can initiate the connection to the manufacturing system using an import wizard or any other software or application program (hereafter "application") capable of retrieving data from the manufacturing system. The application can connect to the manufacturing system over a network using manufacturing system identification data. The manufacturing system identification data can include one or more of a manufacturing system name, serial number, identification number, location data, internet protocol (IP) address, host name, port number, manufacturing system type or tool type data, a communication file (e.g., a file stored on the manufacturing system) and the like.

The application can then generate a base set of tool data items, where each tool data item includes one or more possible system components of the manufacturing system (e.g., a processing chamber, a load lock, a robot apparatus, etc.). In some embodiments, the base set of tool data items is based on a template associated with a specific tool type. The application, via user input, can add one or more tool data items to a data collection plan. For example, the application can receive a selection of one or more of the base set of tool data items for inclusion in the data collection plan (e.g., one or more tool data items that a user desires to include in the data collection plan). The application, via user input, can also modify one or more parameters of the selected set of tool data items. The parameters can be indicative of the type of data to be collected (in the data collection plan) from the component associated with the tool data item. For example, the parameters can include the type of process performed by a process chamber, such as, for example, deposition process, etch process, cool down process, polishing process, pre-clean process, etc. The application can then retrieve, from the manufacturing system and for each of the selected tool data items (based on the selected parameters), system configuration data. The system configuration data can be added to the data collection plan. The system configuration data can include sensor configuration data, event configuration data, alarm configuration data, and software configuration data (e.g., software settings) from the manufacturing system. The application can also retrieve gas-lines configuration data, from the manufacturing system, for one or more gas-lines used by the manufacturing system. In some embodiments, the gas-line configuration data can be mapped to the corresponding tool data items.

In some embodiments, the application can also retrieve additional system configuration data from the manufacturing system and add the system configuration data to the data collection plan. The additional system configuration data can include other sensor configuration data, event configuration data, alarm configuration data, and software configuration data associated the selected tool data items, configuration data associated with unselected tool data items, or configuration data associated with components of the manufacturing system.

In some embodiments, the application can validate each of the items in the data collection plan. In particular, the application can request the manufacturing system to confirm that it includes identification data of each sensor, event, alarm, and/or software setting that is listed in the DCP. Responsive to the manufacturing system indicating that an identification data does not exist (e.g., a power supply included in a data line item was not installed), the processing logic can remove the corresponding sensor, event, alarm, and/or software setting from the DCP. Once complete, data collection from the manufacturing system can be performed based on the DCP. For example, processing logic can retrieve sensor data, alarm data, event data, and software configuration data associated with the manufacturing system based on the data configuration files included in the DCP.

Aspects of the present disclosure result in technological advantages of significant reduction in time that it takes to generate a data collection plan. This allows a customer to connect to a process tool faster, thus reducing setup time and costs associated with the setup. Further, the reduction in time enables a customer to initiate data collection faster, which allows the customer to quickly detect issues or failures experienced by a chamber sub-system. The present disclosure can also result in quickly generating diagnostic data and performing corrective actions to avoid inconsistent and abnormal products, and unscheduled user time or down time.

FIG. 1 depicts an illustrative computer system architecture 100, according to aspects of the present disclosure. In some embodiments, computer system architecture 100 can be included as part of a manufacturing system for processing substrates, such as manufacturing system 300 of FIG. 3.

Computer system architecture 100 includes a client device 120, manufacturing equipment 124, metrology equipment 128, a predictive server 112 (e.g., to generate predictive data, to provide model adaptation, to use a knowledge base, etc.), and a data store 140. The predictive server 112 can be part of a predictive system 110. The predictive system 110 can further include server machines 170 and 180. The manufacturing equipment 124 can include sensors 126 configured to capture data for a substrate being processed at the manufacturing system. In some embodiments, the manufacturing equipment 124 and sensors 126 can be part of a sensor system that includes a sensor server (e.g., fault detection and classification server (FDC server) at a manufacturing facility) and sensor identifier reader (e.g., front opening unified pod (FOUP) radio frequency identification (RFID) reader for sensor system). In some embodiments, metrology equipment 128 can be part of a metrology system that includes a metrology server (e.g., a metrology database, metrology folders, etc.) and metrology identifier reader (e.g., FOUP RFID reader for metrology system).

Manufacturing equipment 124 can produce products, such as electronic devices, following a recipe or performing runs over a period of time. Manufacturing equipment 124 can include one or more process chambers. Manufacturing equipment 124 can perform a process for a substrate (e.g., a wafer, etc.) at the process chamber. Examples of substrate processes include a deposition process to deposit one or more layers of film on a surface of the substrate, an etch process to form a pattern on the surface of the substrate, etc. Manufacturing equipment 124 can perform each process according to a process recipe. A process recipe defines a particular set of operations to be performed for the substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc.

In some embodiments, manufacturing equipment 124 includes sensors 126 that are configured to generate data associated with a substrate processed at manufacturing system 100. For example, a process chamber can include one or more sensors configured to generate spectral or non-spectral data associated with the substrate before, during, and/or after a process (e.g., a deposition process) is performed for the substrate. In some embodiments, spectral data generated by sensors 126 can indicate a concentration of one or more materials deposited on a surface of a substrate. Sensors 126 configured to generate spectral data associated with a substrate can include reflectometry sensors, ellipsometry sensors, thermal spectra sensors, capacitive sensors, and so forth. Sensors 126 configured to generate non-spectral data associated with a substrate can include temperature sensors, pressure sensors, flow rate sensors, voltage sensors, etc. Further details regarding manufacturing equipment 124 are provided with respect to FIG. 3.

In some embodiments, sensors 126 provide sensor data (e.g., sensor values, features, trace data) associated with manufacturing equipment 124 (e.g., associated with producing, by manufacturing equipment 124, corresponding products, such as wafers). The manufacturing equipment 124 can produce products following a recipe or by performing runs over a period of time. Sensor data received over a period of time (e.g., corresponding to at least part of a recipe or run) can be referred to as trace data (e.g., historical trace data, current trace data, etc.) received from different sensors 126 over time. Sensor data can include a value of one or more of temperature (e.g., heater temperature), spacing (SP), pressure, high frequency radio frequency (HFRF), voltage of electrostatic chuck (ESC), electrical current, material flow, power, voltage, etc. Sensor data can be associated with or indicative of manufacturing parameters such as hardware parameters, such as settings or components (e.g., size, type, etc.) of the manufacturing equipment 124, or process parameters of the manufacturing equipment 124. The sensor data can be provided while the manufacturing equipment 124 is performing manufacturing processes (e.g., equipment readings when processing products). The sensor data can be different for each substrate.

Metrology equipment 128 can provide metrology data associated with substrates processed by manufacturing equipment 124. The metrology data can include a value of film property data (e.g., wafer spatial film properties), dimensions (e.g., thickness, height, etc.), dielectric constant, dopant concentration, density, defects, etc. In some embodiments, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, TEM techniques, and so forth.

In some embodiments, metrology equipment 128 can be included as part of the manufacturing equipment 124. For example, metrology equipment 128 can be included inside of or coupled to a process chamber and configured to generate metrology data for a substrate before, during, and/or after a process (e.g., a deposition process, an etch process, etc.) while the substrate remains in the process chamber. In such instances, metrology equipment 128 can be referred to as in-situ metrology equipment. In another example, metrology equipment 128 can be coupled to another station of manufacturing equipment 124. For example, metrology equipment can be coupled to a transfer chamber, such as transfer chamber 310 of FIG. 3, a load lock, such as load lock 320, or a factory interface, such as factory interface 306. In such instances, metrology equipment 128 can be referred to as integrated metrology equipment. In other or similar embodiments, metrology equipment 128 is not coupled to a station of manufacturing equipment 124. In such instances, metrology equipment 128 can be referred to as inline metrology equipment or external metrology equipment. In some embodiments, integrated metrology equipment and/or inline metrology equipment are configured to generate metrology data for a substrate before and/or after a process.

The client device 120 can include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, the metrology data can be received from the client device 120. Client device 120 can display a graphical user interface (GUI), where the GUI enables the user to provide, as input, metrology measurement values for substrates processed at the manufacturing system. The client device 120 can include a corrective action component 122. Corrective action component 122 can receive user input (e.g., via a Graphical User Interface (GUI) displayed via the client device 120) of an indication associated with manufacturing equipment 124. In some embodiments, the corrective action component 122 transmits the indication to the predictive system 110, receives output (e.g., predictive data) from the predictive system 110, determines a corrective action based on the output, and causes the corrective action to be implemented. In some embodiments, the corrective action component 122 receives an indication of a corrective action from the predictive system 110 and causes the corrective action to be implemented. In some embodiments, the client device 120 includes an installation component 121. Installation component 121 can execute a set of operations to generate a data collection plan (DCP). For example, installation component 121 can execute the set of operations of FIG. 4, which will be explained in further detail below. Each client device 120 can include an operating system that allows users to one or more of generate, view, or edit data (e.g., indication associated with manufacturing equipment 124, corrective actions associated with manufacturing equipment 124, etc.).

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). The data store 140 can store data associated with processing a substrate at manufacturing equipment 124. For example, data store 140 can store data collected by sensors 126 at manufacturing equipment 124 before, during, or after a substrate process (referred to as process data). Process data can refer to historical process data (e.g., process data generated for a prior substrate processed at the manufacturing system) and/or current process data (e.g., process data generated for a current substrate processed at the manufacturing system). Data store can also store spectral data or non-spectral data associated with a portion of a substrate processed at manufacturing equipment 124. Spectral data can include historical spectral data and/or current spectral data.

The data store 140 can also store contextual data associated with one or more substrates processed at the manufacturing system. Contextual data can include a recipe name, recipe step number, preventive maintenance indicator, operator, etc. Contextual data can refer to historical contextual data (e.g., contextual data associated with a prior process performed for a prior substrate) and/or current process data (e.g., contextual data associated with current process or a future process to be performed for a prior substrate). The contextual data can further include identify sensors that are associated with a particular sub-system of a process chamber.

The data store 140 can also store task data. Task data can include one or more sets of operations to be performed for the substrate during a deposition process and can include one or more settings associated with each operation. For example, task data for a deposition process can include a temperature setting for a process chamber, a pressure setting for a process chamber, a flow rate setting for a precursor for a material of a film deposited on a substrate, etc. In another example, task data can include controlling pressure at a defined pressure point for the flow value. Task data can refer to historical task data (e.g., task data associated with a prior process performed for a prior substrate) and/or current task data (e.g., task data associated with current process or a future process to be performed for a substrate).

In some embodiments, data store 140 can be configured to store identification data. The identification data can include sensor identification data, event identification data, alarm identification data, constants, and other data used to identify components or functions of the manufacturing equipment 124. The sensor identification data can include ID numbers of sensors, In some embodiments, data store 140 can be configured to store event data and alarm data. Event data can include any data associated with an event, such as initiation of a process on a substrate, transfer of a substrate, completion of a process, etc. The event data can include timestamp data, metadata, identification (ID) data, etc. The alarm data can include any data associated with an alert, error, or warning generated by the manufacturing computer system architecture 100. Similarly, the alarm data can include timestamp data, metadata, ID data, etc.

In some embodiments, data store 140 can be configured to store data that is not accessible to a user of the manufacturing system. For example, process data, spectral data, contextual data, etc. obtained for a substrate being processed at the manufacturing system is not accessible to a user (e.g., an operator) of the manufacturing system. In some embodiments, all data stored at data store 140 can be inaccessible by the user of the manufacturing system. In other or similar embodiments, a portion of data stored at data store 140 can be inaccessible by the user while another portion of data stored at data store 140 can be accessible by the user. In some embodiments, one or more portions of data stored at data store 140 can be encrypted using an encryption mechanism that is unknown to the user (e.g., data is encrypted using a private encryption key). In other or similar embodiments, data store 140 can include multiple data stores where data that is inaccessible to the user is stored in one or more first data stores and data that is accessible to the user is stored in one or more second data stores.

In some embodiments, data store 140 can be configured to store data associated with known fault patterns. A fault pattern can be a one or more values (e.g., a vector, a scalar, etc.) associated with one or more issues or failures associated with a process chamber sub-system. In some embodiments, a fault pattern can be associated with a corrective action. For example, a fault pattern can include parameter adjustment steps to correct the issue or failure indicated by the fault pattern. For example, the predictive system can compare a determined fault pattern to a library of known fault patterns to determine the type of failure experienced by a sub-system, the cause of the failure, the recommended corrective action to correct the fault, and so forth. The fault pattern data can be generated using, for example, the sensor data collected by the DCP.

In some embodiments, predictive system 110 includes predictive server 112, server machine 170 and server machine 180. The predictive server 112, server machine 170, and server machine 180 can each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Server machine 170 includes a training set generator 172 that is capable of generating training data sets (e.g., a set of data inputs and a set of target outputs) to train, validate, and/or test a machine-learning model 190. Machine-learning model 190 can be any algorithmic model capable of learning from data. Some operations of data set generator 172 is described in detail below with respect to FIG. 2. In some embodiments, the data set generator 172 can partition the training data into a training set, a validating set, and a testing set. In some embodiments, the predictive system 110 generates multiple sets of training data.

Server machine 180 can include a training engine 182, a validation engine 184, a selection engine 185, and/or a testing engine 186. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 can be capable of training one or more machine-learning models 190. Machine-learning model 190 can refer to the model artifact that is created by the training engine 182 using the training data (also referred to herein as a training set) that includes training inputs and corresponding target outputs (correct answers for respective training inputs). The training engine 182 can find patterns in the training data that map the training input to the target output (the answer to be predicted), and provide the machine-learning model 190 that captures these patterns. The machine-learning model 190 can use one or more of a statistical modelling, support vector machine (SVM), Radial Basis Function (RBF), clustering, supervised machine-learning, semi-supervised machine-learning, unsupervised machine-learning, k-nearest neighbor algorithm (k-NN), linear regression, random forest, neural network (e.g., artificial neural network), etc.

One type of machine learning model that can be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities can be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks can learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In a plasma process tuning, for example, the raw input can be process result profiles (e.g., thickness profiles indicative of one or more thickness values across a surface of a substrate); the second layer can compose feature data associated with a status of one or more zones of controlled elements of a plasma process system (e.g., orientation of zones, plasma exposure duration, etc.); the third layer can include a starting recipe (e.g., a recipe used as a starting point for determining an updated process recipe the process a substrate to generate a process result the meets threshold criteria). Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs can be that of the network and can be the number of hidden layers plus one. For recurrent neural networks, in which a signal can propagate through a layer more than once, the CAP depth is potentially unlimited.

In one embodiment, one or more machine learning model is a recurrent neural network (RNN). An RNN is a type of neural network that includes a memory to enable the neural network to capture temporal dependencies. An RNN is able to learn input-output mappings that depend on both a current input and past inputs. The RNN will address past and future flow rate measurements and make predictions based on this continuous metrology information. RNNs can be trained using a training dataset to generate a fixed number of outputs (e.g., to determine a set of substrate processing rates, determine modification to a substrate process recipe). One type of RNN that can be used is a long short term memory (LSTM) neural network.

Training of a neural network can be achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce correct output when presented with inputs that are different than the ones present in the training dataset.

A training dataset containing hundreds, thousands, tens of thousands, hundreds of thousands or more sensor data and/or process result data (e.g., metrology data such as one or more thickness profiles associated with the sensor data) can be used to form a training dataset.

To effectuate training, processing logic can input the training dataset(s) into one or more untrained machine learning models. Prior to inputting a first input into a machine learning model, the machine learning model can be initialized. Processing logic trains the untrained machine learning model(s) based on the training dataset(s) to generate one or more trained machine learning models that perform various operations as set forth above. Training can be performed by inputting one or more of the sensor data into the machine learning model one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer can be another hidden layer or an output layer. In either case, the nodes at the next layer receive the output values from the nodes at the previous layer, and each node applies weights to those values and then generates its own output value. This can be performed at each layer. A final layer is the output layer, where there is one node for each class, prediction and/or output that the machine learning model can produce.

Accordingly, the output can include one or more predictions or inferences. For example, an output prediction or inference can include one or more predictions of film buildup on chamber components, erosion of chamber components, predicted failure of chamber components, and so on. Processing logic determines an error (i.e., a classification error) based on the differences between the output (e.g., predictions or inferences) of the machine learning model and target labels associated with the input training data. Processing logic adjusts weights of one or more nodes in the machine learning model based on the error. An error term or delta can be determined for each node in the artificial neural network. Based on this error, the artificial neural network adjusts one or more of its parameters for one or more of its nodes (the weights for one or more inputs of a node). Parameters can be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters can include adjusting the weights assigned to each of the inputs for one or more neurons at one or more layers in the artificial neural network.

After one or more rounds of training, processing logic can determine whether a stopping criterion has been met. A stopping criterion can be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy can be, for example, 70%, 80% or 90% accuracy. In one embodiment, the stopping criterion is met if accuracy of the machine learning model has stopped improving. If the stopping criterion has not been met, further training is performed. If the stopping criterion has been met, training can be complete. Once the machine learning model is trained, a reserved portion of the training dataset can be used to test the model.

Once one or more trained machine learning models 190 are generated, they can be stored in predictive server 112 as predictive component 114 or as a component of predictive component 114.

The validation engine 184 can be capable of validating machine-learning model 190 using a corresponding set of features of a validation set from training set generator 172. Once the model parameters have been optimized, model validation can be performed to determine whether the model has improved and to determine a current accuracy of the deep learning model. The validation engine 184 can determine an accuracy of machine-learning model 190 based on the corresponding sets of features of the validation set. The validation engine 184 can discard a trained machine-learning model 190 that has an accuracy that does not meet a threshold accuracy. In some embodiments, the selection engine 185 can be capable of selecting a trained machine-learning model 190 that has an accuracy that meets a threshold accuracy. In some embodiments, the selection engine 185 can be capable of selecting the trained machine-learning model 190 that has the highest accuracy of the trained machine-learning models 190.

The testing engine 186 can be capable of testing a trained machine-learning model 190 using a corresponding set of features of a testing set from data set generator 172. For example, a first trained machine-learning model 190 that was trained using a first set of features of the training set can be tested using the first set of features of the testing set. The testing engine 186 can determine a trained machine-learning model 190 that has the highest accuracy of all of the trained machine-learning models based on the testing sets.

As described in detail below, predictive server 112 includes a predictive component 114 that is capable of providing data indicative of the expected behavior of each sub-system of a process chamber, expected errors that can occur, and other predictive data generated by running trained machine-learning model 190 on the current sensor data input to obtain one or more outputs. The predictive server 112 can further provide diagnostic data. This will be explained in further detail below.

The client device 120, manufacturing equipment 124, sensors 126, metrology equipment 128, predictive server 112, data store 140, server machine 170, and server machine 180 can be coupled to each other via a network 130. In some embodiments, network 130 is a public network that provides client device 120 with access to predictive server 112, data store 140, and other publicly available computing devices. In some embodiments, network 130 is a private network that provides client device 120 access to manufacturing equipment 124, metrology equipment 128, data store 140, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

It should be noted that in some other implementations, the functions of server machines 170 and 180, as well as predictive server 112, can be provided by a fewer number of machines. For example, in some embodiments, server machines 170 and 180 can be integrated into a single machine, while in some other or similar embodiments, server machines 170 and 180, as well as predictive server 112, can be integrated into a single machine.

In general, functions described in one implementation as being performed by server machine 170, server machine 180, and/or predictive server 112 can also be performed on client device 120. In addition, the functionality attributed to a particular component can be performed by different or multiple components operating together.

In embodiments, a "user" can be represented as a single individual. However, other embodiments of the disclosure encompass a "user" being an entity controlled by a plurality of users and/or an automated source. For example, a set of individual users federated as a group of administrators can be considered a "user."

Figure 2:
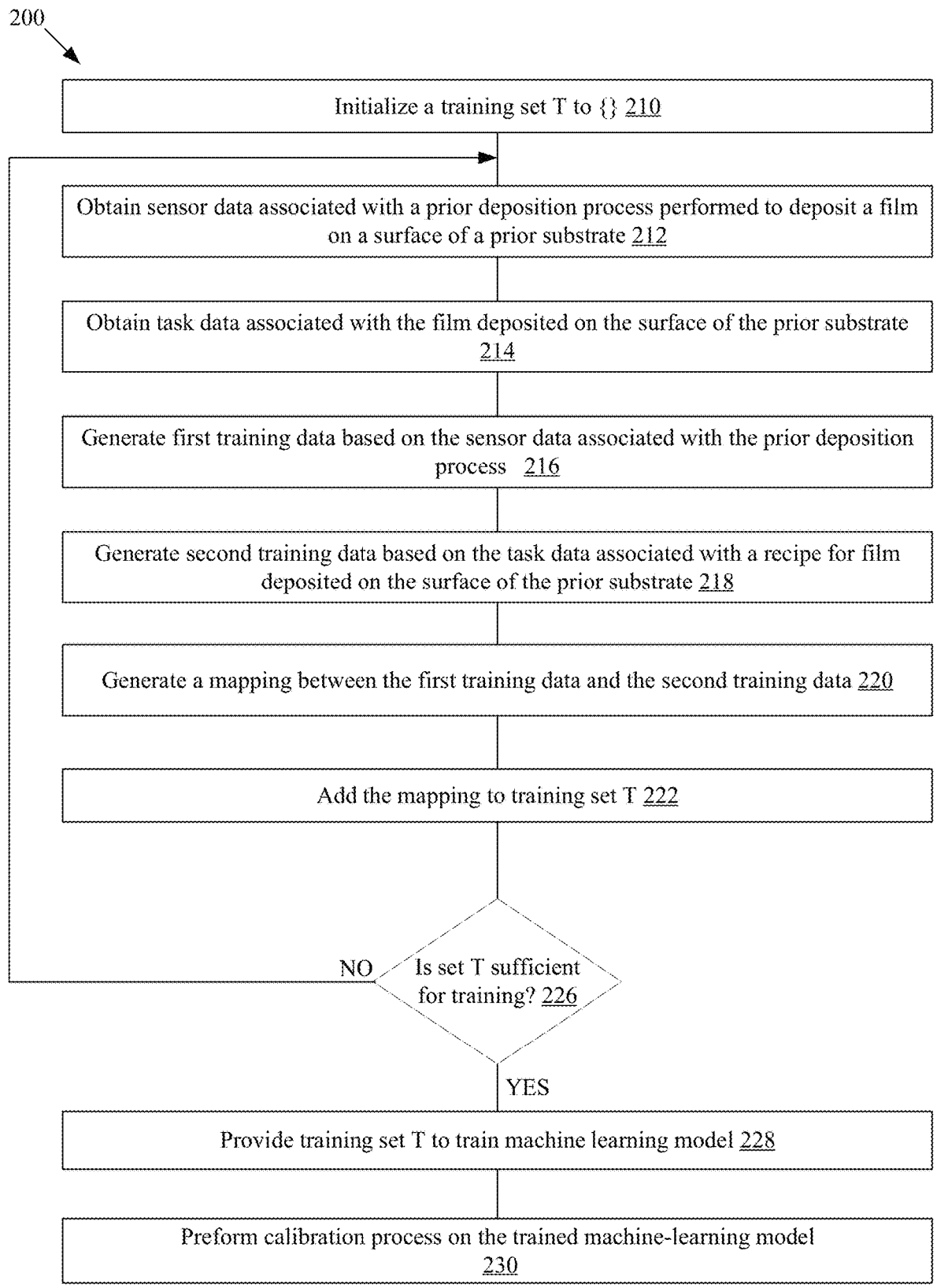
FIG. 2 is a flow diagram of a method for training a machine-learning model, according to certain embodiments.

FIG. 2 is a flow chart of a method 200 for training a machine-learning model, according to aspects of the present disclosure. Method 200 is performed by processing logic that can include hardware (circuitry, dedicated logic, etc.), software (such as is run on a general purpose computer system or a dedicated machine), firmware, or some combination thereof. In one implementation, method 200 can be performed by a computer system, such as computer system architecture 100 of FIG. 1. In other or similar implementations, one or more operations of method 200 can be performed by one or more other machines not depicted in the figures. In some aspects, one or more operations of method 200 can be performed by server machine 170, server machine 180, and/or predictive server 112.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, processing logic initializes a training set T to an empty set (e.g., { }).

At block 212, processing logic obtains sensor data (e.g., sensor values, features, trace data) associated with a prior deposition process performed to deposit one or more layers of film on a surface of a prior substrate. The sensor data can include data collected using a DCP. The sensor data can be further associated with a sub-system of a process chamber. A sub-system can be characterized as a set of sensors related with an operational parameter of the process chamber. An operational parameter can be a temperature, a flow rate, a pressure, and so forth. For example, a pressure sub-system can be characterized by one or more sensors measuring the gas flow, the chamber pressure, the control valve angle, the foreline (vacuum line between pumps) pressure, the pump speed, and so forth. Each process chamber can include multiple different sub-systems, such as a pressure sub-system, a flow sub-system, a temperature sub-system, and so forth.

In some embodiments, the sensor data associated with the deposition process is historical data associated with one or more prior deposition settings for a prior deposition process previously performed for a prior substrate at a manufacturing system. For example, the historical data can be historical contextual data associated with the prior deposition process stored at data store 140. In some embodiments, the one or more prior deposition settings can include at least one of a prior temperature setting for the prior deposition process, a prior pressure setting for the prior deposition setting, a prior flow rate setting for a precursor for one or more material of the prior film deposited on the surface of the prior substrate, or any other setting associated with the deposition process. A flow rate setting can refer to a flow rate setting for the precursor at an initial instance of the prior deposition process (referred to as an initial flow rate setting), a flow rate setting for the precursor at a final instance of the prior deposition process (referred to as a final flow rate setting), or a ramping rate for the flow rate of the precursor during the deposition process. In one example, the precursor for the prior film can include a boron-containing precursor or a silicon-containing precursor. In some embodiments, the sensor data can also be associated with a prior etching process performed on the prior substrate, or any other process performed in the process chamber.

At block 214, processing logic obtains task data associated with a recipe for film deposited on the surface of the prior substrate. For example, the task data can a required temperature setting, a pressure setting, a flow rate setting for a precursor for a material of a film deposited on a substrate, etc. Task data can include historical task data for a prior film deposited on a surface of a prior substrate. In some embodiments, the historical task data for the prior film can correspond to a historical task value associated with a recipe for the prior film. Processing logic can obtain the task data from data store 140, in accordance with previously described embodiments.

At block 216, processing logic generates first training data based on the obtained sensor data associated with the prior deposition process performed for the prior substrate. At block 218, processing logic generates second training data based on the task data associated with the recipe for film deposited on the surface of the prior substrate.

At block 220, processing logic generates a mapping between the first training data and the second training data. The mapping refers to the first training data that includes or is based on data for the prior deposition process performed for the prior substrate and the second training data that includes or is based on task data associated with the recipe for film deposited on the surface of the prior substrate, where the first training data is associated with (or mapped to) the second training data. At block 224, processing logic adds the mapping to the training set T.

At block 226, processing logic determines whether the training set, T, includes a sufficient amount of training data to train a machine-learning model. It should be noted that in some implementations, the sufficiency of training set T can be determined based simply on the number of mappings in the training set, while in some other implementations, the sufficiency of training set T can be determined based on one or more other criteria (e.g., a measure of diversity of the training examples, etc.) in addition to, or instead of, the number of input/output mappings. Responsive to determining the training set does not include a sufficient amount of training data to train the machine-learning model, method 200 returns to block 212. Responsive to determining the training set T includes a sufficient amount of training data to train the machine-learning model, method 200 continues to block 228.

At block 228, processing logic provides the training set T to train the machine-learning model. In one implementation, the training set T is provided to training engine 182 of server machine 180 to perform the training. In the case of a neural network, for example, input values of a given input/output mapping are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in the training set T.

In some embodiments, the processing logic can perform outlier detection methods to remove anomalies from the training set T prior to training the machine-learning model. Outlier detection methods can include techniques that identify values that differ significantly from the majority the training data. These values can be generated from errors, noise, etc.

At block 230, processing logic perform a calibration process on the trained machine-learning model. In some embodiments, the processing logic can compare the expected behavior of the process chamber sub-system to current behavior of the process chamber sub-system based on the differences in values between the predictive behavior and the current behavior. For example, the processing logic can compare one or more values associated with the predictive data of the pressure sub-system, the flow sub-system, or the temperature sub-system to one or more values associated with the current measured behavior of the pressure sub-system, the flow sub-system, or the temperature sub-system, respectively.

After block 230, the machine-learning model can be used to generate one or more values indicative of a fault pattern (e.g., abnormal behavior) of the process chamber subsystem, generate predicative data indicative of the type of fault (e.g., issue, failure, etc.), and/or perform a corrective action(s) to correct the suspected issue or failure. The predictive data can be generated by comparing the fault pattern to the library of known fault patterns.

Figure 3:
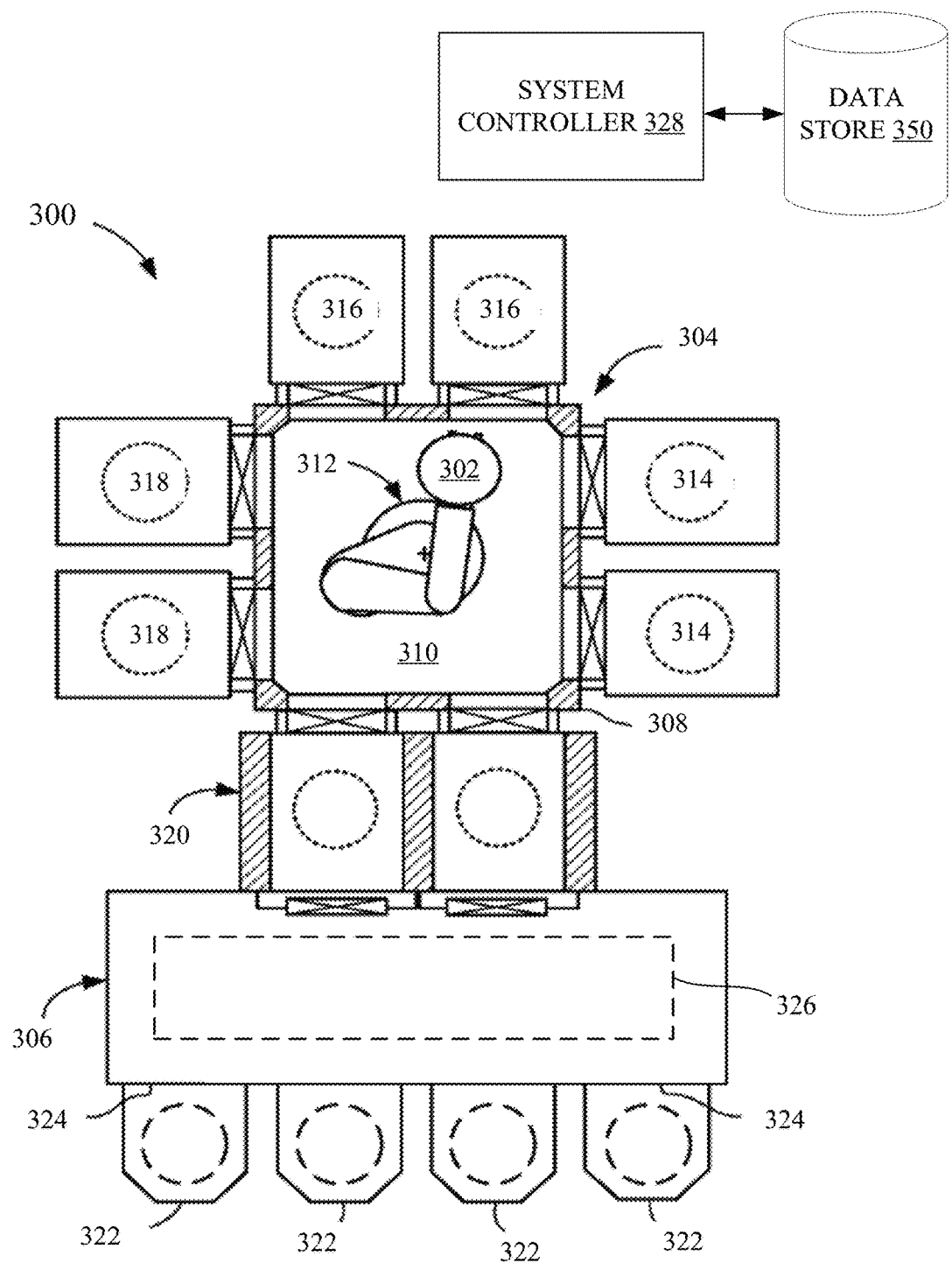
FIG. 3 is a top schematic view of an example manufacturing system, according to certain embodiments.

In some embodiments, a manufacturing system can include more than one process chambers. For example, example manufacturing system 300 of FIG. 3 illustrates multiple process chambers 314, 316, 318. It should be noted that, in some embodiments, data obtained to train the machine-learning model and data collected to be provided as input to the machine-learning model can be associated with the same process chamber of the manufacturing system. In other or similar embodiments, data obtained to train the machine-learning model and data collected to be provided as input to the machine-learning model can be associated with different process chambers of the manufacturing system. In other or similar embodiments, data obtained to train the machine-learning model can be associated with a process chamber of a first manufacturing system and data collected to be provide as input to the machine-learning model can be associated with a process chamber of a second manufacturing system.

FIG. 3 is a top schematic view of an example manufacturing system 300, according to aspects of the present disclosure. Manufacturing system 300 can perform one or more processes on a substrate 302. Substrate 302 can be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 300 can include a process tool 304 and a factory interface 306 coupled to process tool 304. Process tool 304 can include a housing 308 having a transfer chamber 310 therein. Transfer chamber 310 can include one or more process chambers (also referred to as processing chambers) 314, 316, 318 disposed therearound and coupled thereto. Process chambers 314, 316, 318 can be coupled to transfer chamber 310 through respective ports, such as slit valves or the like. Transfer chamber 310 can also include a transfer chamber robot 312 configured to transfer substrate 302 between process chambers 314, 316, 318, load lock 320, etc. Transfer chamber robot 312 can include one or multiple arms where each arm includes one or more end effectors at the end of each arm. The end effector can be configured to handle particular objects, such as wafers, sensor discs, sensor tools, etc.

Process chambers 314, 316, 318 can be adapted to carry out any number of processes on substrates 302. A same or different substrate process can take place in each processing chamber 314, 316, 318. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Process chambers 314, 316, 318 can each include one or more sensors configured to capture data for substrate 302 before, after, or during a substrate process. For example, the one or more sensors can be configured to capture spectral data and/or non-spectral data for a portion of substrate 302 during a substrate process. In other or similar embodiments, the one or more sensors can be configured to capture data associated with the environment within process chamber 314, 316, 318 before, after, or during the substrate process. For example, the one or more sensors can be configured to capture data associated with a temperature, a pressure, a gas concentration, etc. of the environment within process chamber 314, 316, 318 during the substrate process.

A load lock 320 can also be coupled to housing 308 and transfer chamber 310. Load lock 320 can be configured to interface with, and be coupled to, transfer chamber 310 on one side and factory interface 306. Load lock 320 can have an environmentally-controlled atmosphere that can be changed from a vacuum environment (wherein substrates can be transferred to and from transfer chamber 310) to at or near atmospheric-pressure inert-gas environment (wherein substrates can be transferred to and from factory interface 306) in some embodiments. Factory interface 306 can be any suitable enclosure, such as, e.g., an Equipment Front End Module (EFEM). Factory interface 306 can be configured to receive substrates 302 from substrate carriers 322 (e.g., Front Opening Unified Pods (FOUPs)) docked at various load ports 324 of factory interface 306. A factory interface robot 326 (shown dotted) can be configured to transfer substrates 302 between carriers (also referred to as containers) 322 and load lock 320. Carriers 322 can be a substrate storage carrier or a replacement part storage carrier.

Manufacturing system 300 can also be connected to a client device (not shown) that is configured to provide information regarding manufacturing system 300 to a user (e.g., an operator). In some embodiments, the client device can provide information to a user of manufacturing system 300 via one or more graphical user interfaces (GUIs). For example, the client device can provide information regarding a target thickness profile for a film to be deposited on a surface of a substrate 302 during a deposition process performed at a process chamber 314, 316, 318 via a GUI. The client device can also provide information regarding a modification to a process recipe in view of a respective set of deposition settings predicted to correspond to the target profile, in accordance with embodiments described herein.

Manufacturing system 300 can also include a system controller 328. System controller 328 can be and/or include a computing device such as a personal computer, a server computer, a programmable logic controller (PLC), a microcontroller, and so on. System controller 328 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 328 can include a data storage device (e.g., one or more disk drives and/or solid state drives), a main memory, a static memory, a network interface, and/or other components. System controller 328 can execute instructions to perform any one or more of the methodologies and/or embodiments described herein. In some embodiments, system controller 328 can execute instructions to perform one or more operations at manufacturing system 300 in accordance with a process recipe. The instructions can be stored on a computer readable storage medium, which can include the main memory, static memory, secondary storage and/or processing device (during execution of the instructions).

System controller 328 can receive data from sensors included on or within various portions of manufacturing system 300 (e.g., processing chambers 314, 316, 318, transfer chamber 310, load lock 320, etc.). In some embodiments, data received by the system controller 328 can include spectral data and/or non-spectral data for a portion of substrate 302. In other or similar embodiments, data received by the system controller 328 can include data associated with processing substrate 302 at processing chamber 314, 316, 318, as described previously. For purposes of the present description, system controller 328 is described as receiving data from sensors included within process chambers 314, 316, 318. However, system controller 328 can receive data from any portion of manufacturing system 300 and can use data received from the portion in accordance with embodiments described herein. In an illustrative example, system controller 328 can receive data from one or more sensors for process chamber 314, 316, 318 before, after, or during a substrate process at the process chamber 314, 316, 318. Data received from sensors of the various portions of manufacturing system 300 can be stored in a data store 350. Data store 350 can be included as a component within system controller 328 or can be a separate component from system controller 328. In some embodiments, data store 350 can be data store 140 described with respect to FIG. 1.

Figure 4:
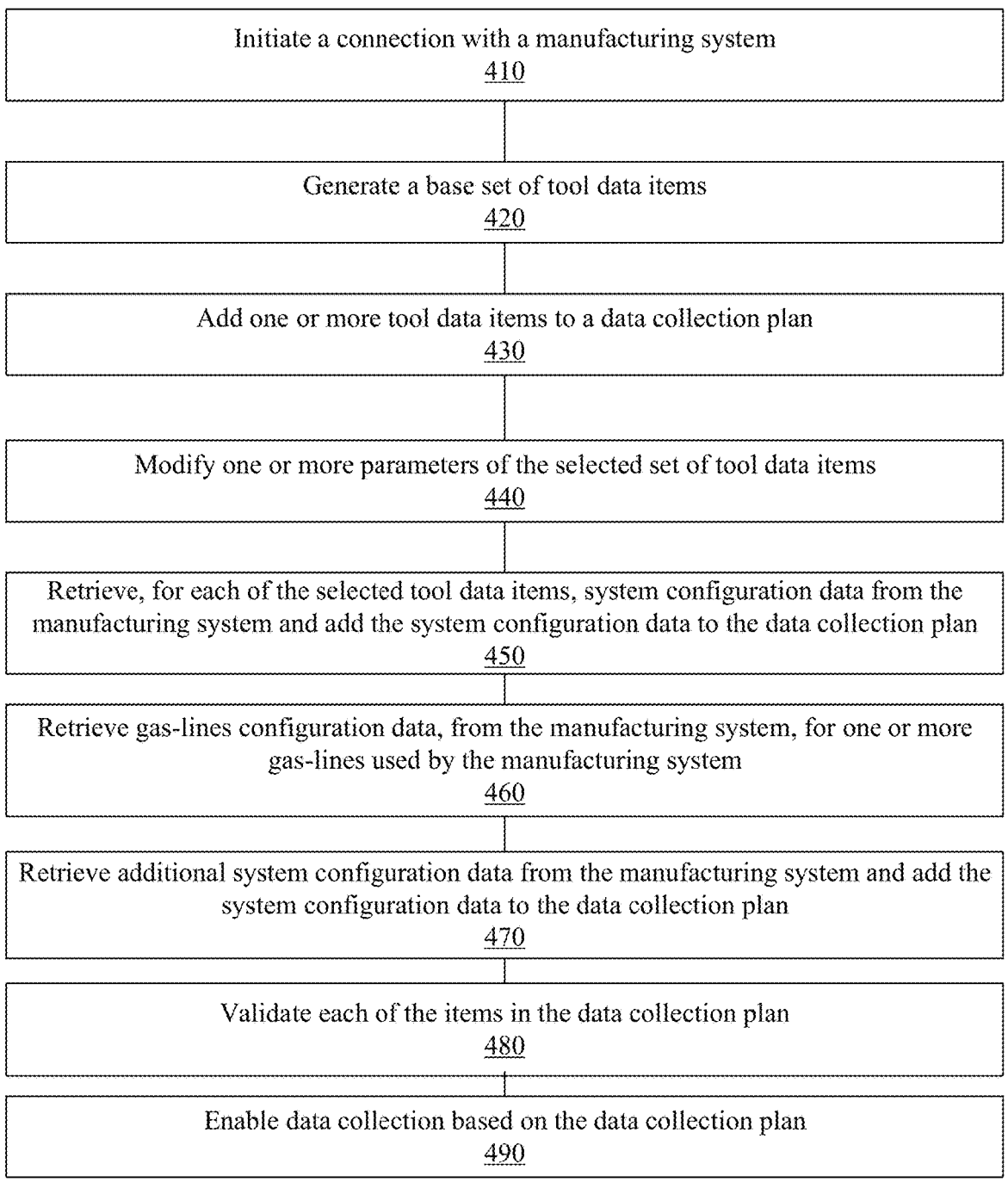
FIG. 4 is a flow diagram for generating a data collection plan (DCP) for a manufacturing system, according to certain embodiments.

FIG. 4 is a flow chart of a method 400 for generating a data collection plan (DCP) for a semiconductor manufacturing system, according to aspects of the present disclosure. Method 400 is performed by processing logic that can include hardware (circuitry, dedicated logic, etc.), software (such as is run on a general purpose computer system or a dedicated machine), firmware, or some combination thereof. In one implementation, method 400 can be performed by a computer system, such as computer system architecture 100 of FIG. 1. In other or similar implementations, one or more operations of method 400 can be performed by one or more other machines not depicted in the figures. In some aspects, one or more operations of method 400 can be performed by client device 120 and/or the fault detection and classification server (FDC server).

At operation 410, processing logic initiates a connection with a manufacturing system. In some embodiments, the manufacturing system can be a semiconductor manufacturing system, such as manufacturing equipment 124, or manufacturing system 300. In some embodiments, processing logic can initiate the connection to the manufacturing system using an import wizard or any other software or application program capable of retrieving data from the manufacturing system. The processing logic can connect, via a network (e.g., network 130) to the manufacturing system using manufacturing system identification data. The manufacturing system identification data can include one or more of a manufacturing system name, serial number, identification number, location data, internet protocol (IP) address, host name, port number, manufacturing system type or tool type data, a communication file (e.g., a file stored on the manufacturing system (e.g., data store 350)). In some embodiments, the processing logic can receive user input indicative of whether a new DCP is to be generated for a manufacturing system, or whether an existing DCP is to be modified for the manufacturing system. In some embodiments, the manufacturing system identification data can be received, by the processing logic, via a GUI that enable a user to provide the identification data as input.

Figure 5B:
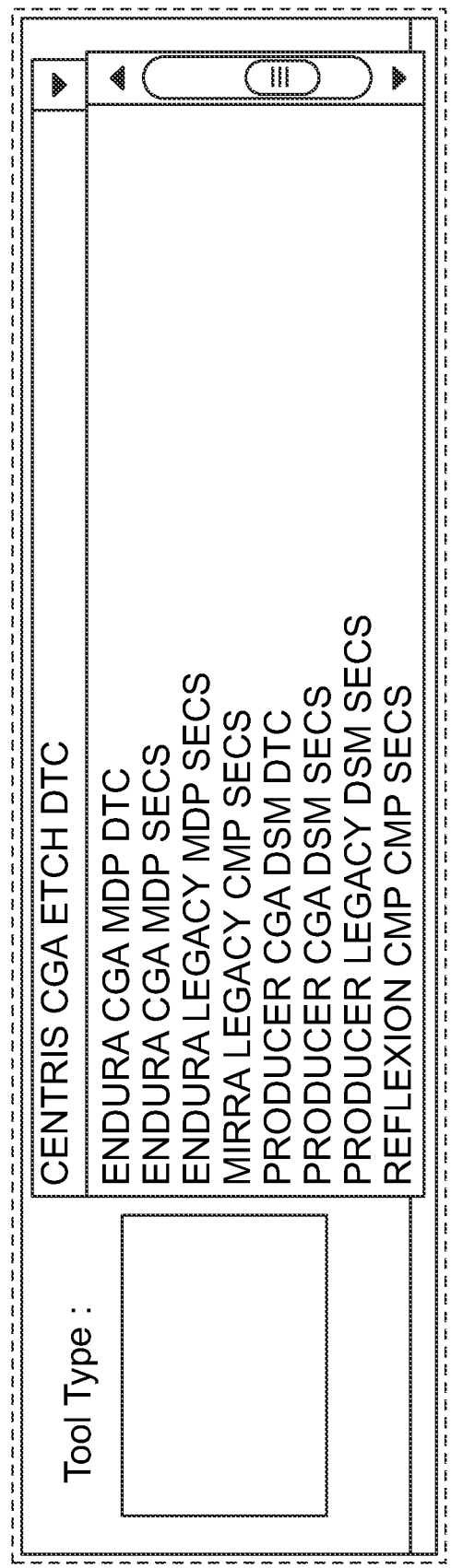

FIGS. 5A-5F are illustrations of example GUI interfaces for generating the DCP. FIG. 5A shows a GUI interface for providing the manufacturing system identification data. As shown, user input can indicate the manufacturing system name 510, serial number 512, location data 514, IP address 516, port number 518, manufacturing system type or tool type data 520, and/or a connection file 522. The tool type data can indicate the type of process tool that the processing logic is connected to. The tool type data can be indicative of the number of process chambers that the type of process tool generally has, the type or functions of each of the process chambers (e.g., etch process, deposition process, chemical-mechanical polishing (CMP) process etc.), the sub-functions of each process chamber (e.g., deposition process chamber can perform at least one of a chemical vapor deposition (CVD) process, an atomic layer deposition (ALD) process, etc.), and so forth. FIG. 5B shows a GUI interface for selecting a tool type from a listing of tool types in a drop down menu.

Returning to FIG. 4, at operation 420, the processing logic generates a base set of tool data items. Each tool data item can include one or more possible system components of a manufacturing system (e.g., manufacturing system 300), such as, for example, a processing chamber(s), a load lock(s), a robot apparatus(es), or any other components of the manufacturing system). In some embodiments, the processing logic can generate the base set of tool data items based on a template associated with the tool type data. For example, responsive to the tool type data being indicative of a specific process tool model, the processing logic can generate the base set of tool data items that includes possible or typical system components included in the manufacturing system that includes said process tool model. The processing logic can then present, via the GUI, the set of tool data items associated with the semiconductor manufacturing system, and receive, via the GUI, user input selecting one or more of the tool data items. FIG. 5C shows a GUI interface displaying a base set of tool data items for the data collection plan. The base set of tool data items includes all of the possible and/or typical system components (e.g., processing chambers, load locks, robot apparatuses, and any other components of a manufacturing system), in which each row is associated with one of the system components.

At operation 430, the processing logic can add one or more tool data items to a data collection plan. In some embodiments, the processing logic can receive a selection of one or more of the base set of tool data items for inclusion in the data collection plan. For example, a user can desire to include, in the data collection plan, only a subset of the tool data items provided by the base set of tool data items. In some embodiments, not all of the provided tool data items can be available in the manufacturing system. Accordingly, the user can select one or more of the tool data items. As shown in FIG. 5D, the user can select each components desired to be included in the data collection plan. It is noted that some manufacturing systems can be customized, and that some components displayed in the base set of tool data items cannot exists on a particular manufacturing system. Accordingly, the processing logic can remove, from the data collection plan, any selected components that do not exist on the particular manufacturing system. This will be discussed in more detail at block 470.

Figure 5E:
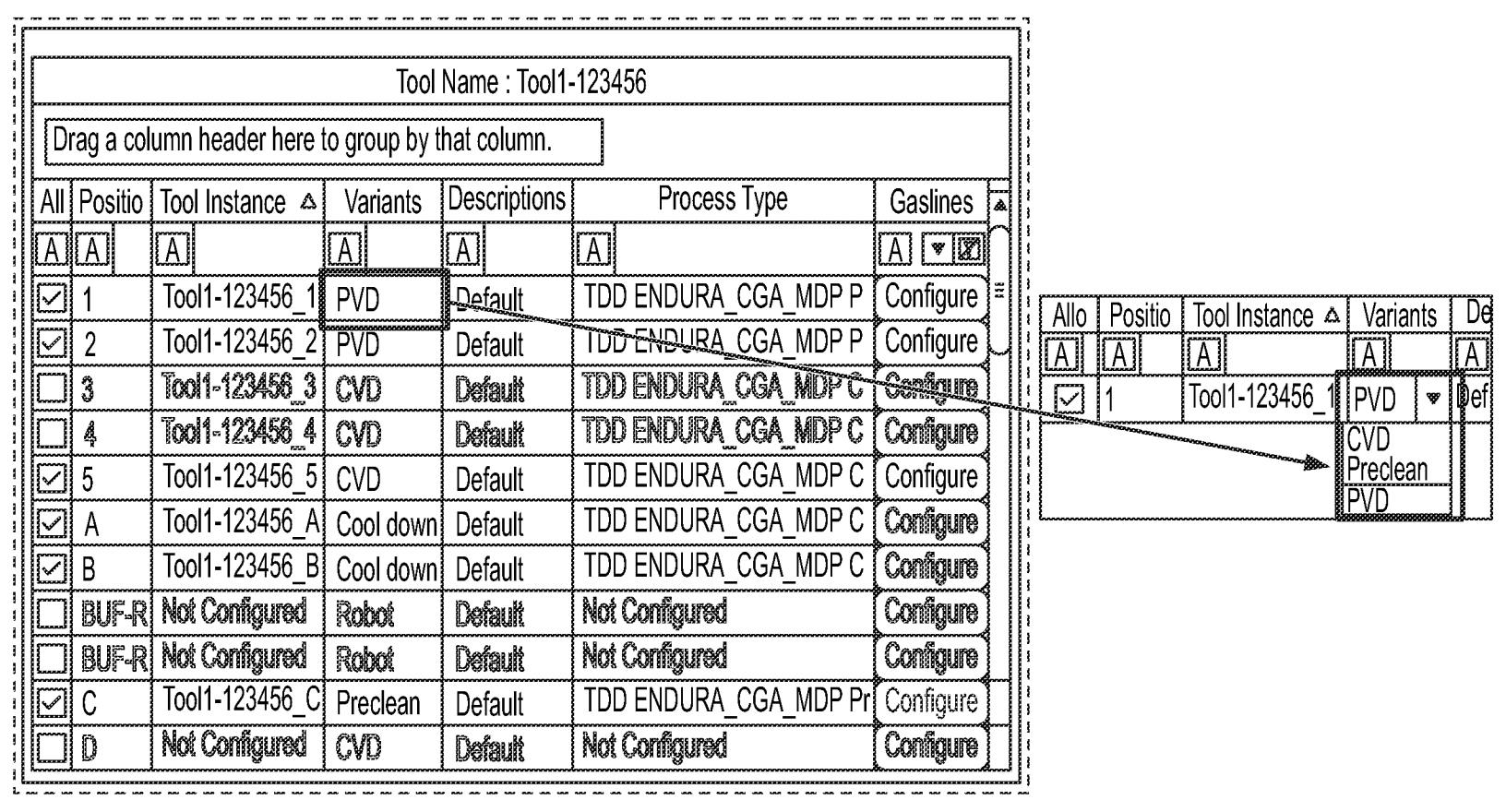
Figure 5F:
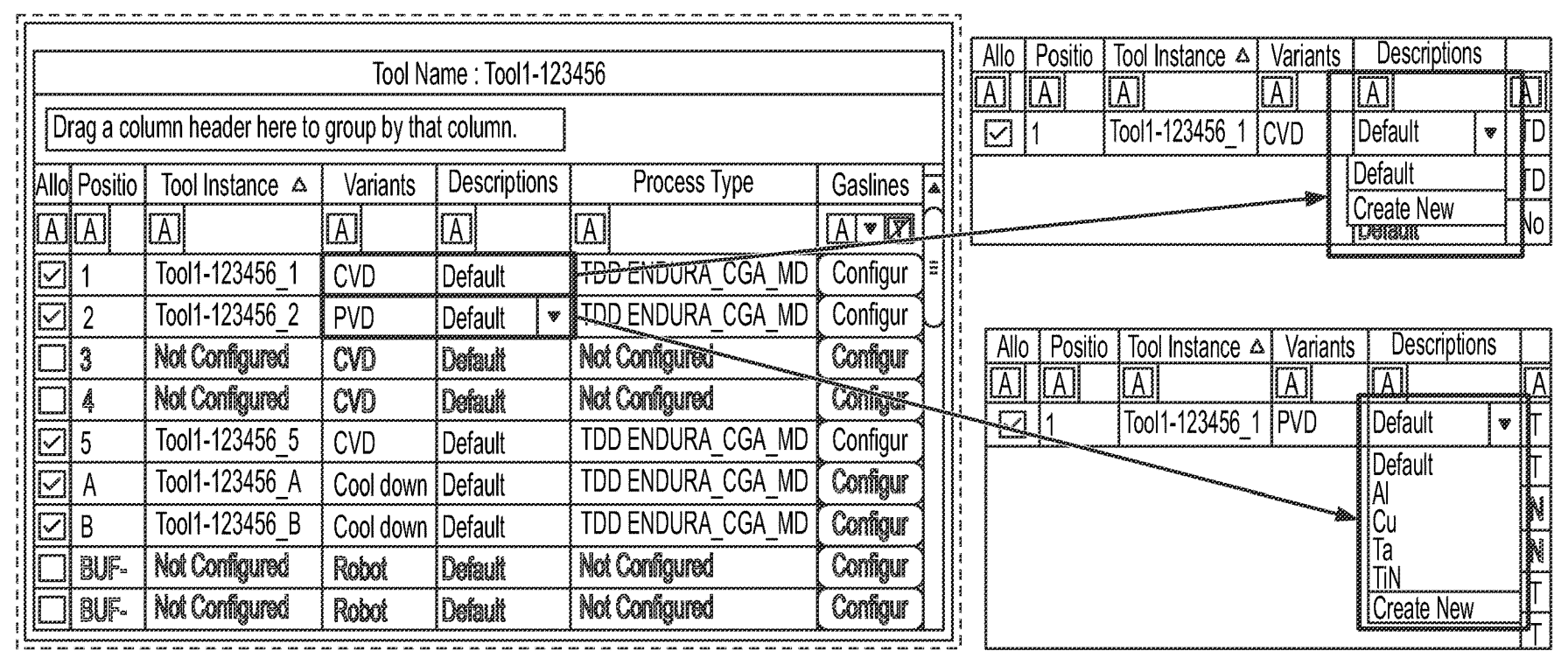

At operation 440, the processing logic can modify one or more parameters of the selected set of tool data items. The parameters can be indicative of the type of data to be collected (in the data collection plan) from the component associated with the tool data item. For example, the parameters can include the type of process performed by a process chamber, such as, for example, deposition process, etch process, cool down process, polishing process, pre-clean process, etc. Each parameter can also include one or more sub-parameters. For example, for a physical vapor deposition process, the sub-parameters can include one or more types of material used during the process (e.g., copper, aluminum, tantalum, etc.). As shown in FIG. 5E, the user can select a parameter (e.g., CVD, preclean, PVD) that is associated with the process chamber of the first tool data item. As shown in FIG. 5F, the user can select a sub-parameter (e.g., aluminum, copper, tantalum, titanium nitride for PVD) that is associated with the parameter of the tool data item.

At operation 450, the processing logic retrieves, for each of the selected tool data items, system configuration data from the manufacturing system and add the system configuration data to the data collection plan. In some embodiments, the system configuration data retrieved and added can be based on the one or more parameters and sub-parameters selected. The system configuration data can include sensor configuration data, event configuration data, alarm configuration data, and software configuration data (e.g., software settings) from the manufacturing system. In particular, the processing logic can retrieve sensor configuration data, from a sensor configuration file stored on data store 350, for each sensor on the manufacturing system. The processing logic can retrieve event configuration data from an event configuration file stored on data store 350, for each event configured on the manufacturing system. The processing logic can retrieve alarm configuration data, from an alarm configuration file stored on data store 350, for each alarm configured on the manufacturing system. The processing logic can retrieve software configuration data, from a software configuration file stored on data store 350, for each software configuration used by the manufacturing system. Each configuration file can be associated with an ID (e.g., a sensor ID, an event ID, and alarm ID, or a software configuration file ID).

At operation 460, the processing logic retrieve gas-lines configuration data, from the manufacturing system, for one or more gas-lines used by the manufacturing system. Configuration data for each gas-line can be added as a tool data item in the data collection plan. A gas-line can be any mechanism used to deliver a process gas (e.g., deposition gas, cleaning gas, etching gas, etc.) to or from a component of the manufacturing system. The gas-line configuration data can include the gas-line number, the type of gas that flows through the gas-line, etc. In some embodiments, the gas-line configuration data can be mapped to the corresponding tool data items (e.g., the gas-line configuration data can be mapped to each tool data item that is associated with a process chamber that is connected to said gas-lines).

At operation 470, the processing logic can retrieve additional system configuration data from the manufacturing system and add the system configuration data to the data collection plan. The additional system configuration data can include sensor configuration data, event configuration data, alarm configuration data, and software configuration data (e.g., software settings) from the manufacturing system that was not retrieved and added by operation 450. The additional system configuration data can include configuration data associated the selected tool data items, unselected tool data items, or other components of the manufacturing system.

In some embodiments, the processing logic can apply one or more filters to filter which system configuration data is added to the data collection plan. Each filter can be based on the type of process tool selected at block 410. The filter(s) can filter system configuration data not associated with the type of selected process tool, filter configuration data that is insignificant or redundant, etc. For example, if the manufacturing system only include process chamber configured to perform a deposition process, and the retrieved system configuration data includes data associated with process chambers configured to perform an etching process, the processing logic can filer out said etching process data.

In some embodiments, the processing logic can map one or more of the additional system configuration files (e.g., using the associated ID) to one or more of the data line items (or to one or more of the parameters). For example, for a tool data item associated with a process chamber configured to perform the CVD process, the processing logic can map sensor configuration items, event items, alarm items, and constant items associated with the sub-systems used for the CVD process, such as the pressure sub-system, the flow sub-system, the temperature sub-system.

At operation 480, the processing logic can validate each of the items in the data collection plan. In particular, the processing logic can determine whether the element associated with each configuration data item is included and/or is functional in the manufacturing system. In some embodiments, the processing logic can generate a list of each ID associated with each of the configuration items included in the data collection plan, and request the manufacturing system to confirm that each of the IDs is included and/or is functional in the manufacturing system. Responsive to the manufacturing system indicating that an ID does not exist (e.g., a power supply included in a data line item was not installed) or is not functional (e.g., a sensor associated with a sensor ID is damaged), the processing logic can remove the corresponding configuration data from the DCP. In some embodiments, the processing logic can display, on the client device 120, a list of the invalid configuration items (e.g., a list of invalid IDs)

At operation 490, the processing logic can enable data collection based on the DCP. In particular, the processing logic can execute one or more data collection operations at the semiconductor manufacturing system based on the data collection plan. For example, processing logic can obtain sensor data, alarm data, event data, and software configuration data associated with the manufacturing system based on the data configuration files included in the DCP. In some embodiments, the obtained sensor data can be used to train a machine-learning model using, for example, method 200. In some embodiments, the obtained sensor data can be input into a trained machine-learning model to perform a corrective action based on the output generated by the trained-machine learning model. This will be explained in greater detail with reference to FIG. 6.

Figure 6:
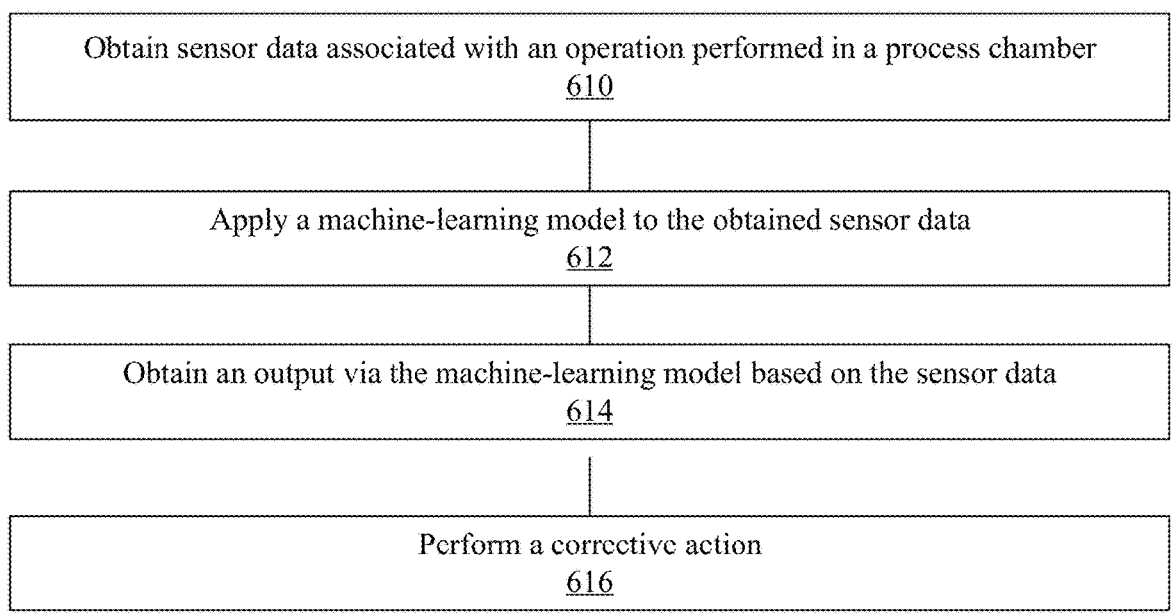
FIG. 6 is a flow diagram of a method for determining a failure type of a process chamber sub-system using a machine-learning model, according to certain embodiments.

FIG. 6 is a flow chart of a method 600 for determining a failure type of a process chamber sub-system using a machine-learning model, according to aspects of the present disclosure. Method 600 is performed by processing logic that can include hardware (circuitry, dedicated logic, etc.), software (such as is run on a general purpose computer system or a dedicated machine), firmware, or some combination thereof. In one implementation, method 600 can be performed by a computer system, such as computer system architecture 100 of FIG. 1. In other or similar implementations, one or more operations of method 600 can be performed by one or more other machines not depicted in the figures. In some aspects, one or more operations of method 600 can be performed by server machine 170, server machine 180, and/or predictive server 112.

At operation 610, processing logic obtains sensor data associated with an operation performed in a process chamber. The sensor data retrieved can be based on the data configuration files in the DCP. In some embodiments, the operation can include a deposition process performed in a process chamber to deposit one or more layers of film on a surface of a substrate, an etch process performed on the one or more layers of film on the surface of the substrate, etc. The operation can be performed according to a recipe. The sensor data can include a value of one or more of temperature (e.g., heater temperature), spacing, pressure, high frequency radio frequency, voltage of electrostatic chuck, electrical current, material flow, power, voltage, etc. Sensor data can be associated with or indicative of manufacturing parameters such as hardware parameters, such as settings or components (e.g., size, type, etc.) of the manufacturing equipment 124, or process parameters of the manufacturing equipment 124.

At operation 612, processing logic applies a machine-learning model (e.g. model 190) to the obtained sensor data. The machine-learning model can be used to generate one or more values associated with the expected behavior or predictive data of the process chamber sub-system. For example, the machine-learning model can use an algorithm to generate predictive behavior of the process chamber sub-system using the training set T.

At operation 614, processing logic obtains an output via the machine-learning model based on the sensor data. In some embodiments, the output can be a value indicative of a pattern (e.g., a fault pattern). In particular, the output can include predicative data of whether the current data is indicative of a failure being experience by the process chamber. In some embodiments, the output can be at least one value indicative of a difference between the expected behavior of the process chamber sub-system and the actual behavior of the process chamber sub-system. In particular, the value(s) can be indicative of a difference between actual values of a set of sensors associated with the sub-system and the expected values of the set of sensors. The failure can include a mechanism failure, high or low pressure, high or low gas flow, high or low temperature, etc.

At operation 616, the processing logic can perform (or suggest) a corrective action based on the output generated by the machine-learning model. In some embodiments, the corrective action can be determined based on data obtained from a fault library. In some embodiments, the corrective action can include generating an alert or an indication, to the client device 120, of the determined problem. In some embodiments, the corrective action can include the processing logic indicating the type of fault or failure, the cause of the fault or failure, and/or a recommend corrective action. In some embodiments, the corrective action can include the processing logic adjusting one or more parameters of a deposition process recipe (e.g., a temperature setting for the process chamber, a pressure setting for the process chamber, a flow rate setting for a precursor for a material included in the film deposited on the substrate surface, etc.) based on a desired property for the film. In some embodiments, the deposition process recipe can be adjusted before, during (e.g., in real time) or after the deposition process.

Figure 7:
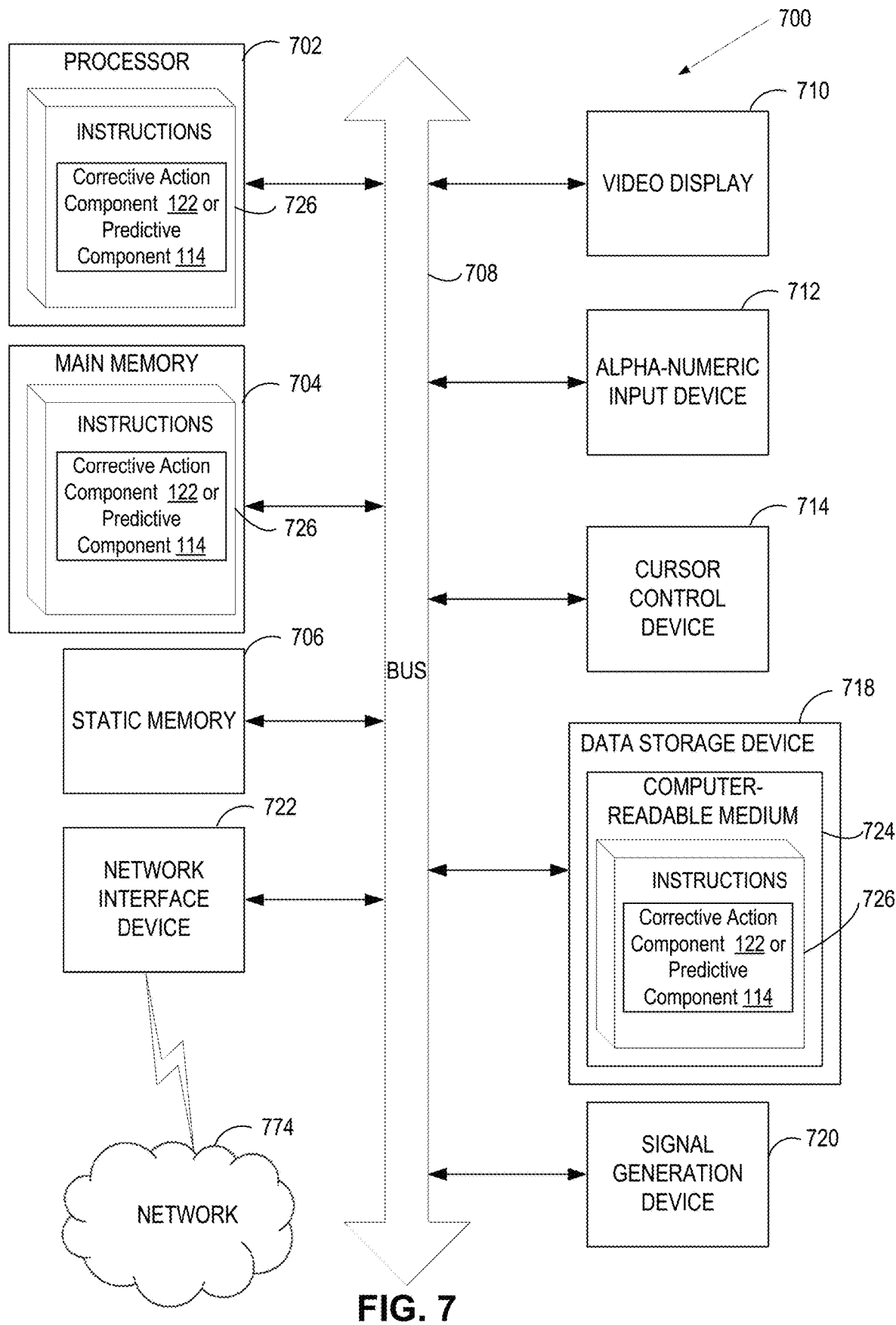
FIG. 7 is a block diagram illustrating a computer system, according to certain embodiments.

FIG. 7 is a block diagram illustrating a computer system 700, according to certain embodiments. In some embodiments, computer system 700 can be connected (e.g., via a network, such as a Local Area Network (LAN), an intranet, an extranet, or the Internet) to other computer systems. Computer system 700 can operate in the capacity of a server or a client computer in a client-server environment, or as a peer computer in a peer-to-peer or distributed network environment. Computer system 700 can be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 can include a processing device 702, a volatile memory 704 (e.g., Random Access Memory (RAM)), a non-volatile memory 706 (e.g., Read-Only Memory (ROM) or Electrically-Erasable Programmable ROM (EEPROM)), and a data storage device 716, which can communicate with each other via a bus 708.

Processing device 702 can be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 700 can further include a network interface device 722 (e.g., coupled to network 774). Computer system 700 also can include a video display unit 710 (e.g., an LCD), an alphanumeric input device 712 (e.g., a keyboard), a cursor control device 714 (e.g., a mouse), and a signal generation device 720.

In some implementations, data storage device 716 can include a non-transitory computer-readable storage medium 724 on which can store instructions 726 encoding any one or more of the methods or functions described herein, including instructions encoding components of FIG. 1 (e.g., corrective action component 122, predictive component 114, etc.) and for implementing methods described herein.

Instructions 726 can also reside, completely or partially, within volatile memory 704 and/or within processing device 702 during execution thereof by computer system 700, hence, volatile memory 704 and processing device 702 can also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and can not have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
    initiating, by a processor, a connection with a semiconductor manufacturing system;
    generating a set of tool data items associated with the semiconductor manufacturing system;
    providing a graphical user interface (GUI) presenting the set of tool data items associated with the semiconductor manufacturing system;
    receiving, via the GUI, user input selecting one or more tool data items from the set of tool data items;
    adding configuration data associated with the one or more tool data items to a data collection plan;
    validating the configuration data to generate a modified data collection plan by:
        locating, in the semiconductor manufacturing system, corresponding identification data indicative of whether a respective component of the semiconductor manufacturing system associated with respective configuration data is at least one of included in the semiconductor manufacturing system or is functional in the semiconductor manufacturing system; and
        removing, from the data collection plan, a subset of the configuration data for which corresponding identification data was not located; and
    executing one or more data collection operations at the semiconductor manufacturing system based on the modified data collection plan.

2. The method of claim 1, wherein the initiating the connection is based on at least one of a manufacturing system name, a serial number, an identification number, location data, an internet protocol (IP) address, a host name, a port number, a manufacturing system type, or a communication file.

3. The method of claim 1, wherein each tool data item of the set of tool data items is associated with at least one of a processing chamber, a load lock, or a robot apparatus, of the semiconductor manufacturing system.

4. The method of claim 1, wherein the set of tool data items is generated using a template associated with a type of process tool included in the semiconductor manufacturing system.

5. The method of claim 1, further comprising:
    modifying one or more parameters of a tool data item of the set of tool data items, wherein the one or more parameters are indicative of a type of data to be collected from a component associated with the tool data item of the set of tool data items.

6. The method of claim 1, further comprising:
    retrieving the configuration data from the semiconductor manufacturing system.

7. The method of claim 1, further comprising:
    retrieving gas-lines configuration data, from the semiconductor manufacturing system, for one or more gas-lines used by the semiconductor manufacturing system; and
    adding the gas-lines configuration data to the data collection plan.

8. The method of claim 1, wherein the configuration data comprises at least one of sensor configuration data, event configuration data, alarm configuration data, or software configuration data.

9. The method of claim 1, further comprising:
    applying a filter to filter a subset of the configuration data from the data collection plan.

10. The method of claim 1, wherein the validating comprises requesting the semiconductor manufacturing system to confirm that corresponding identification data of respective configuration data is included in the semiconductor manufacturing system.

11. The method of claim 1, further comprising:
    applying a trained machine-learning model to data obtained by the one or more data collection operations; and
    performing a corrective action based on an output generated by the trained machine-learning model.

12. The method of claim 1, further comprising:
    obtaining sensor data via the one or more data collection operations; and
    training a machine-learning model using the obtained sensor data.

13. A system, comprising:
    a memory; and
    a processing device operatively coupled with the memory, to perform operations comprising:
        initiating a connection with a semiconductor manufacturing system;
        generating a set of tool data items associated with the semiconductor manufacturing system;
        providing a graphical user interface (GUI) presenting the set of tool data items associated with the semiconductor manufacturing system;

receiving, via the GUI, user input selecting one or more tool data items from the set of tool data items;

adding configuration data associated with the one or more tool data items to a data collection plan;

validating the configuration data to generate a modified data collection plan by:

locating, in the semiconductor manufacturing system, corresponding identification data indicative of whether a respective component of the semiconductor manufacturing system associated with respective configuration data is at least one of included in the semiconductor manufacturing system or is functional in the semiconductor manufacturing system; and removing, from the data collection plan, a subset of the configuration data for which corresponding identification data was not located; and executing one or more data collection operations at the semiconductor manufacturing system based on the modified data collection plan.

14. The system of claim 13, wherein the initiating the connection is based on at least one of a manufacturing system name, a serial number, an identification number, location data, an internet protocol (IP) address, a host name, a port number, a manufacturing system type, or a communication file.

15. The system of claim 13, wherein each tool data item of the set of tool data items is associated with at least one of a processing chamber, a load lock, or a robot apparatus, of the semiconductor manufacturing system.

16. The system of claim 13, wherein the set of tool data items is generated using a template associated with a type of process tool included in the semiconductor manufacturing system.

17. The system of claim 13, wherein the processing device is to perform operations further comprising:

modifying one or more parameters of a tool data item of the set of tool data items, wherein the one or more parameters are indicative of type of data to be collected from a component associated with the tool data item of the set of tool data items.

18. The system of claim 13, wherein the processing device is to perform operations further comprising:

retrieving the configuration data from the semiconductor manufacturing system.

19. The system of claim 13, wherein the processing device is to perform operations further comprising:

retrieving gas-lines configuration data, from the semiconductor manufacturing system, for one or more gas-lines used by the semiconductor manufacturing system; and adding the gas-lines configuration data to the data collection plan.

20. The system of claim 13, wherein the configuration data comprises at least one of sensor configuration data, event configuration data, alarm configuration data, or software configuration data.

21. The system of claim 13, wherein the processing device is to perform operations further comprising:

applying a filter to filter the configuration data from the data collection plan.

22. A non-transitory computer-readable storage medium comprising instructions that, when executed by a processing device, cause the processing device to perform operations comprising:

initiating a connection with a semiconductor manufacturing system;

generating a set of tool data items associated with the manufacturing system;

providing a graphical user interface (GUI) presenting the set of tool data items associated with the semiconductor manufacturing system;

receiving, via the GUI, user input selecting one or more tool data items from the set of tool data items;

adding configuration data associated with the one or more tool data items to a data collection plan;

validating the configuration data to generate a modified data collection plan by:

locating, in the semiconductor manufacturing system, corresponding identification data indicative of whether a respective component of the semiconductor manufacturing system associated with respective configuration data is at least one of included in the semiconductor manufacturing system or is functional in the semiconductor manufacturing system; and removing, from the data collection plan, a subset of the configuration data for which corresponding identification data was not located; and executing one or more data collection operations at the semiconductor manufacturing system based on the modified data collection plan.

\* \* \* \* \*